(12) United States Patent
Shiozawa (10) Patent No.: US 7,984,639 B2
(45) Date of Patent: Jul. 26, 2011

(54) LIQUID LEAK SENSING STRUCTURE

(75) Inventor: Masashi Shiozawa, Honjo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 12/210,923

(22) Filed: Sep. 15, 2008

(65) Prior Publication Data

US 2009/0007639 A1 Jan. 8, 2009

Related U.S. Application Data

(63) Continuation of application No. 11/404,219, filed on Apr. 14, 2006, now Pat. No. 7,430,896.

(30) Foreign Application Priority Data

Aug. 30, 2005 (JP) ................................. 2005-249520

(51) Int. Cl.
*G01M 3/04* (2006.01)
(52) U.S. Cl. ................. 73/40; 73/49.2; 165/70; 361/699
(58) Field of Classification Search ............. 73/40, 49.2, 73/49.3; 165/70; 361/699
See application file for complete search history.

(56) References Cited

U.S. PATENT DOCUMENTS

| | | | |
|---|---|---|---|
| 5,086,829 A | 2/1992 | Asakawa et al. | |
| 5,537,291 A | 7/1996 | Onodera et al. | |
| 6,991,669 B1 * | 1/2006 | Partridge et al. | ................. 75/313 |
| 2002/0160085 A1 * | 10/2002 | Tokita et al. | ................... 426/124 |
| 2004/0042174 A1 | 3/2004 | Tomioka et al. | |
| 2004/0161642 A1 | 8/2004 | Hisano et al. | |
| 2004/0188069 A1 | 9/2004 | Tomioka et al. | |
| 2006/0178652 A1 * | 8/2006 | Miller, III | .............. 604/385.101 |
| 2007/0125786 A1 | 6/2007 | Akiyama et al. | |

FOREIGN PATENT DOCUMENTS

| | | |
|---|---|---|
| EP | 341932 | 11/1989 |
| GB | 2414585 | 11/2005 |
| JP | 62-126564 | 6/1987 |
| JP | 2000-331699 | 11/2000 |
| JP | 2002-164070 | 6/2002 |
| JP | 2002-232176 | 8/2002 |
| JP | 2005-222756 | 8/2005 |

OTHER PUBLICATIONS

Japanese Patent Application No. 2005-249520, Notice of Reasons for Rejection, mailed Apr. 21, 2009 (English translation).

* cited by examiner

*Primary Examiner* — Daniel S Larkin
(74) *Attorney, Agent, or Firm* — Blakely, Sokoloff, Taylor & Zafman LLP (57) ABSTRACT

According to one embodiment, a liquid leak sensing structure is provided with a casing including a lower wall, a circulation unit received in the casing and providing circulation of a liquid, a liquid leak sensor interposed between the lower wall of the casing and the circulation unit, and a liquid absorbing member interposed between the liquid leak sensor and the circulation unit. The liquid absorbing member permits part of a liquid from the circulation unit to flow therethrough toward the liquid leak sensor.

18 Claims, 12 Drawing Sheets

LIQUID LEAK SENSING STRUCTURE

CROSS-REFERENCE TO RELATED APPLICATIONS

This application is a Continuation of U.S. patent application Ser. No. 11/404,219 filed Apr. 14, 2006, now U.S. Pat. No. 7,430,896, which is based upon and claims the benefit of priority from Japanese Patent Application No. 2005-249520, filed Aug. 30, 2005, the entire contents of which are incorporated herein by reference.

BACKGROUND

1. Field

One embodiment of the invention relates to a liquid leak sensing structure for sensing a liquid leak in a liquid-using apparatus, for example, to a liquid leak sensing structure capable of absorbing a leaking liquid.

2. Description of the Related Art

In recent years, a small-sized, high-output fuel cell device that does not have to be charged is attracting a great deal of attention as the power supply of a portable computer or that of another type of electronic apparatus. An example of such a fuel cell device is a direct methanol fuel cell (DMFC) which uses an aqueous solution of methanol as fuel.

A recent electronic apparatus is provided with a cooling device that uses a liquid to efficiently cool an electronic component (such as a CPU). The liquid the cooling device uses is, for example, an antifreeze solution or water.

As can be seen from the above, many of the recently-developed electronic apparatuses include liquid-using devices inside their casings. Under the circumstances, it may happen that a liquid will leak inside the casings.

A water leakage detecting device adapted for a fuel cell is known as a structure for sensing a liquid leaking from a fuel cell device. The water leakage detecting device detects cooling water leaking from a fuel cell stack. This type of detecting device is described in Jpn. Pat. Appln. KOKAI Publication No. 2002-164070, for example. The detecting device described in this KOKAI Publication No. 2002-164070 comprises a casing having an inclined bottom surface, and a moisture detector provided at the lower end of the bottom surface.

On the other hand, a fuel cell system provided with a water-absorbing member is described in Jpn. Pat. Appln. KOKAI Publication No. 2000-331699. The water-absorbing member described in KOKAI Publication No. 2000-331699 is provided between a discharge port from which a cathode discharge gas is discharged and a supply port from which an oxidizer is supplied. By use of condensed water collected at the discharge port of the cathode discharge gas, the water-absorbing member humidifies the oxidizer when this oxidizer passes through the supply port. Accordingly, the electrolyte films between the anode and the cathode are kept wet.

In the case of the detecting device described in KOKAI Publication No. 2002-164070, a liquid leaking from the fuel cell stack is detected by a moisture detector. However, if the amount of water the moisture detector detects is too large, the liquid may leak out of the casing.

The fuel cell system described in Jpn. Pat. Appln. KOKAI Publication No. 2000-331699 is not provided with a leaking liquid sensor. If a liquid leakage occurs in this type of fuel cell system, this state is not sensed.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a liquid leak sensing structure includes a casing, a circulation unit, a liquid leak sensor, and a liquid absorbing member. The circulation unit is received in the casing and provides circulation of a liquid. The liquid leak sensor is interposed between a lower wall of the casing and the circulation unit. The liquid absorbing member is interposed between the liquid leak sensor and the circulation unit and permits part of a liquid from the circulation unit to flow therethrough toward the liquid leak sensor.

Embodiments of the present invention will now be described, referring to the drawings which show how the invention is applied to a fuel cell device.

Figure 1:
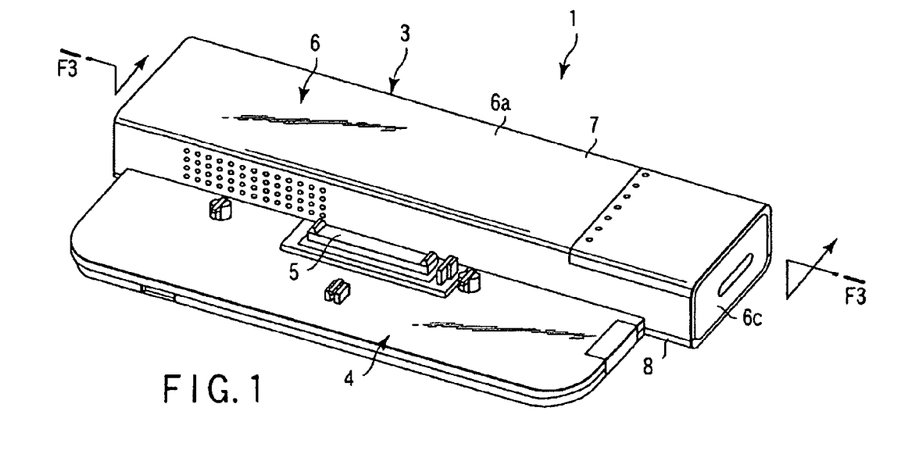
FIG. 1 is an exemplary perspective view of a DMFC apparatus according to the first embodiment of the invention.
Figure 2:
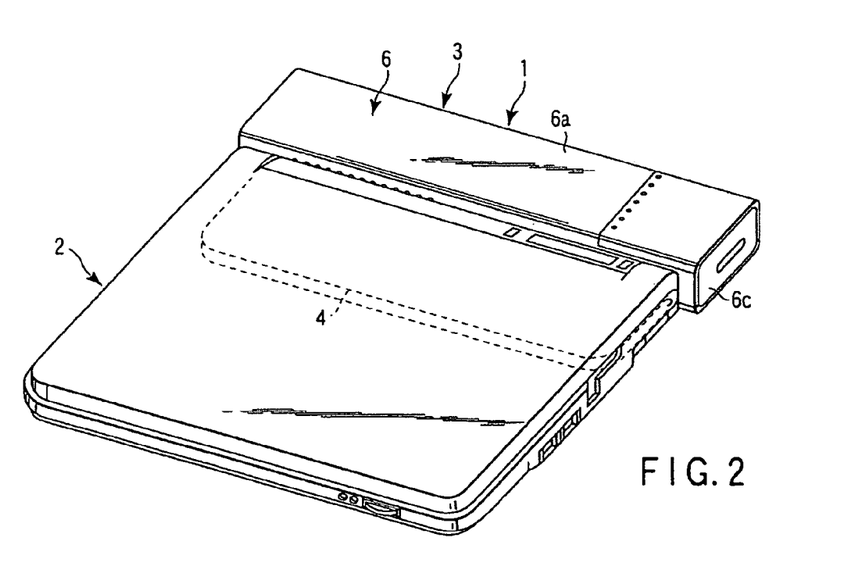
FIG. 2 is an exemplary perspective view showing a state where a portable computer is connected to the DMFC apparatus of the first embodiment.

FIGS. 1 to 8 show a DMFC apparatus 1, which is one example of a liquid leak sensing structure according to the first embodiment of the present invention. FIG. 1 shows the entirety of the DMFC apparatus 1. The DMFC apparatus 1 has a size for use as a power supply of the portable computer 2, as can be seen in FIG. 2.

As shown in FIG. 1, the DMFC apparatus 1 includes a main body 3 and a mount section 4. The main body 3 is elongated and extends in the longitudinal direction of the portable computer 2. The mount section 4 is horizontally projected from the front portion of the main body 3 in such a manner that the rear portion of the portable computer 2 can be mounted on the mount section 4. A power source connector 5 is located on the upper surface of the mount section 4. When the portable computer 2 is placed on the mount section 4, the power source connector 5 is electrically connected to the portable computer 2.

Figure 3:
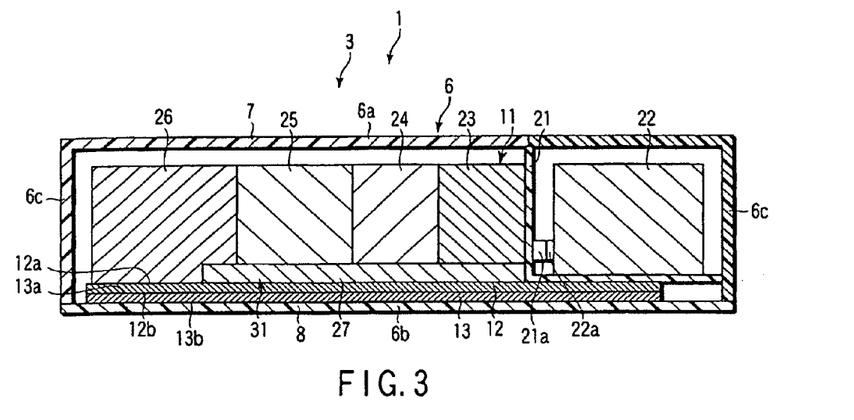
FIG. 3 is an exemplary sectional view of the apparatus main body taken along line F3-F3 in FIG. 1.
Figure 4:
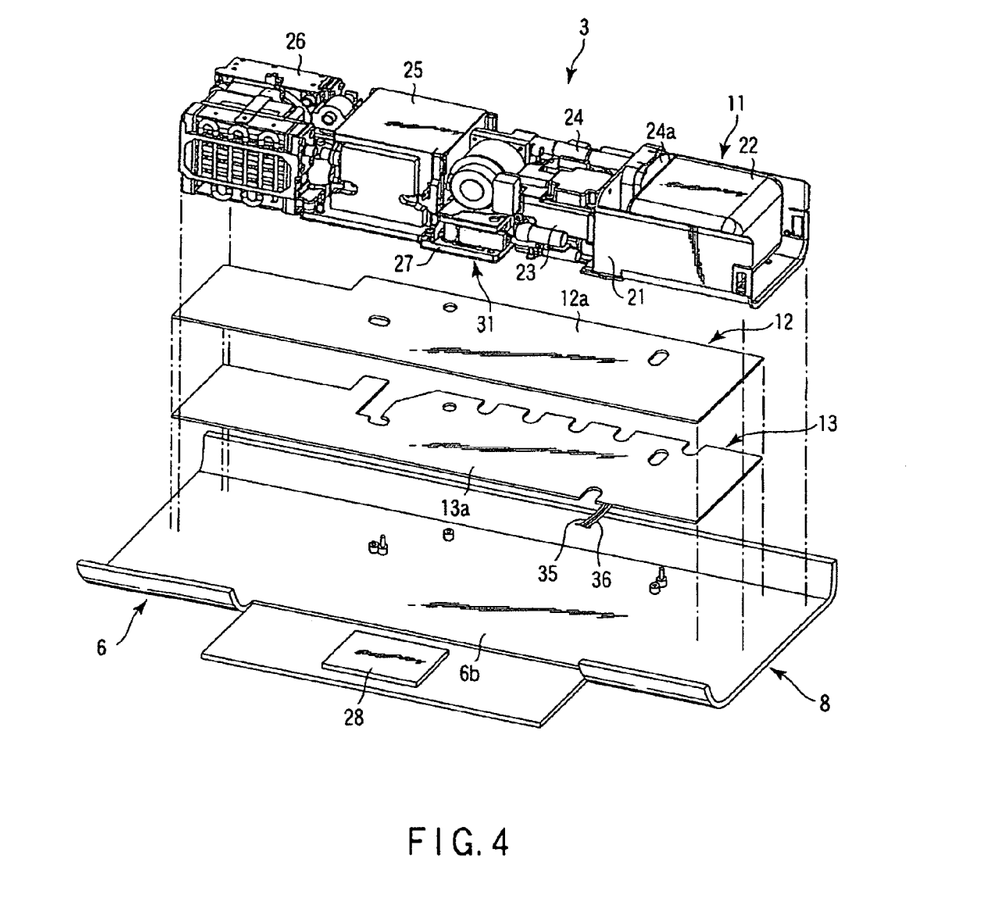
FIG. 4 is an exemplary exploded perspective view of the apparatus main body according to the first embodiment.

As shown in FIG. 3, the main body 3 includes a box-shaped casing 6. The casing 6 has a top cover 7 and a base 8. In the state where the top cover 7 is attached to the base 8 from above, the casing 6 becomes a box-shaped structure including an upper wall 6a, a lower wall 6b, and side walls 6c. As shown in FIGS. 3 and 4, the casing 6 contains a DMFC unit 11, a liquid absorbing sheet 12 and a liquid leak sensor board 13. FIG. 4 shows the main body 3 in an exploded manner, without illustrating the top cover 7.

Figure 5:
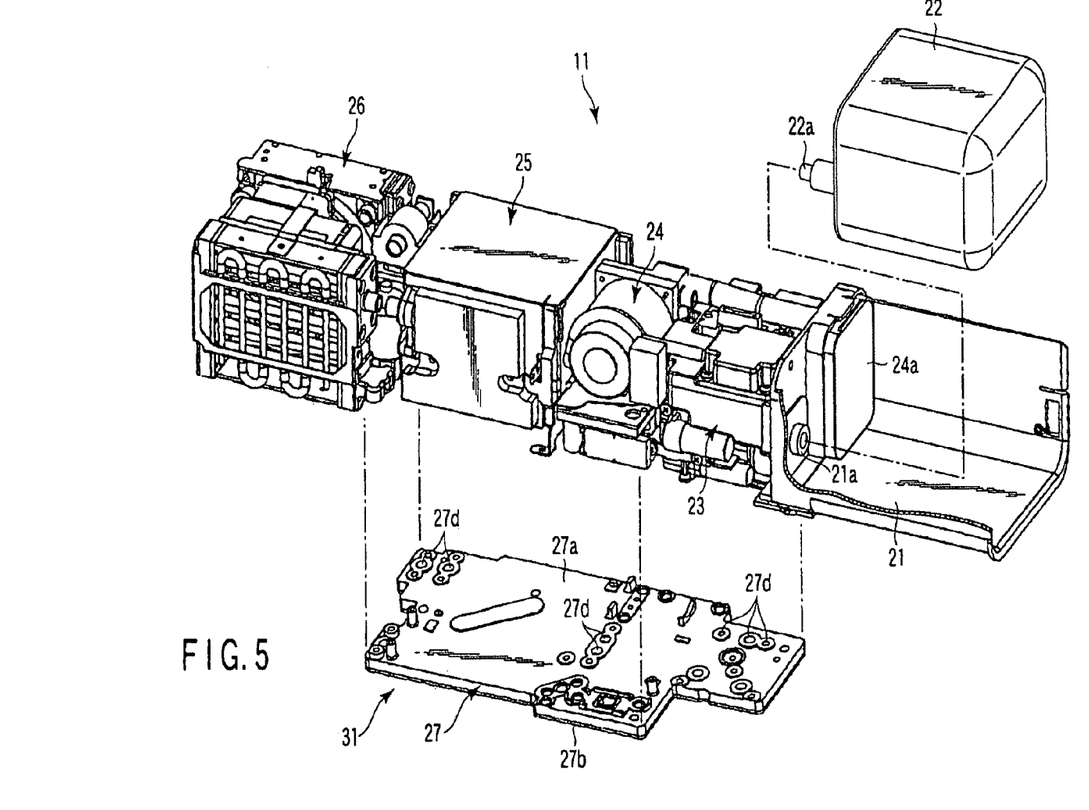
FIG. 5 is an exemplary perspective view of the DMFC unit according to the first embodiment.

The DMFC unit 11 is an example of a power generating unit and is also an example of a circulation unit. As shown in FIGS. 3-5, the DMFC unit 11 is provided with a holder 21, a fuel cartridge 22, a mixing section 23, an air intake section 24, a DMFC stack 25, a cooling section 26, and a base manifold 27. The DMFC unit 11 is also provided with a control section 28 as shown in FIG. 4.

As shown in FIG. 5, the holder 21 is at one end of the DMFC unit 11. The fuel cartridge 22 is detachably coupled to the holder 21. The fuel cartridge 22 contains high-concentration methanol, which is used as a liquid fuel for power generation.

The holder 21 includes a first liquid supply joint 21a. The fuel cartridge 22 includes a second liquid supply joint 22a corresponding in shape to the first liquid supply joint 21a. When the fuel cartridge 22 is attached to the holder 21, the first and second liquid supply joints 21a and 22a are coupled to each other, and the fuel cartridge 22 is connected to the mixing section 23.

The mixing section 23 dilutes the high-concentration methanol supplied from the fuel cartridge 22 and produces a aqueous solution of methanol having a concentration of several % to several dozen %. The mixing section 23 supplies the produced aqueous solution of methanol to the DMFC stack 25.

As shown in FIG. 5, the air intake section 24 has an air intake port 24a which is open to the outside of the DMFC unit 11. The air intake section 24 takes in the outside air through the air intake port 24a and guides it into the DMFC unit 11. The air is then supplied to the DMFC stack 25.

The DMFC stack 25 is an example of a power generator section. In the DMFC stack 25, the aqueous solution of methanol and the oxygen in the air are made to react with each other, for power generation. Carbon dioxide and water vapor are generated as a result of the power generation. The carbon dioxide and the water vapor are supplied to the cooling section 26 along with unreacted methanol.

The cooling section 26 is at the other end of the DMFC unit 11. It cools the carbon dioxide and water vapor generated in the DMFC stack 25, and also cools the unreacted methanol. The cooled and liquefied water and methanol are supplied back to the mixing section 23 and used for producing an aqueous solution of methanol. The carbon dioxide supplied from the DMFC stack 25 is exhausted from the DMFC unit 11.

Figure 6:
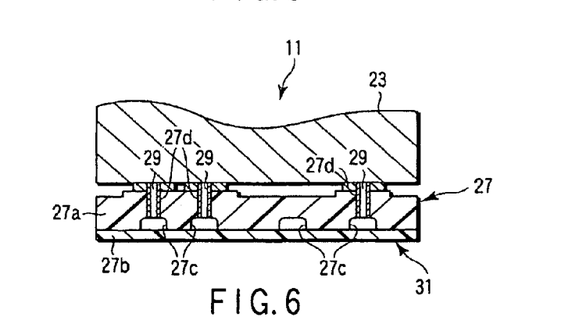
FIG. 6 is an exemplary sectional view of the DMFC unit according to the first embodiment.

As shown in FIGS. 3 and 5, the base manifold 27 is attached to the DMFC unit 11 in such a manner that the bottoms of the mixing section 23, air intake section 24 and DMFC stack 25 are completely covered and the bottom of the cooling section 26 is partly covered. As shown in FIG. 6, the base manifold 27 includes a baseboard 27a and a base cover 27b. A plurality of grooves extending in the longitudinal direction of the DMFC unit 11 are formed in the lower surface of the baseboard 27a.

The base cover 27b is attached to the baseboard 27a from below and covers the grooves. With this structure, the base manifold 27 has a plurality of fluid passages 27c inside, as shown in FIG. 6. The base manifold 27 also has a plurality of communication holes 27d. The communication holes 27d extend between the ceilings of the fluid passages and the upper surface of the base manifold 27. The communication holes 27d are provided only at the necessary positions.

The mixing section 23, DMFC stack 25 and cooling section 26 have communication tubes 29 at positions corresponding to the communication holes 27d. FIG. 6, as an example, shows how the communication tubes 29 of the mixing section 23 are. As can be seen from FIG. 6, the communication tubes 29 protrude downward from the lower surfaces of the mixing section 23. In the state where the communication tubes 29 are inserted into the communication holes 27d, the mixing section 23, DMFC stack 25 and cooling section 26 communicate with each other by way of the fluid passages 27c of the base manifold 27.

The fluid passages 27c described above serve as part of fluid passages through which methanol and water flow inside of the DMFC unit 11. With this structure, the mixing section 23, DMFC stack 25, cooling section 26, and base manifold 27 jointly function as a circulation section 31 for circulating a liquid fuel.

As shown in FIG. 4, the control section 28 is contained inside the mount section 4. The control section 28 monitors the states of the mixing section 23, air intake section 24, DMFC-stack 25 and cooling section 26 and controls the operations of these units 23, 24, 25 and 26. In addition to this, the control section 28 supplies the power generated by the DMFC stack 25 to the power source connector 5.

A power generating unit to which one embodiment of the invention can be applied is not limited to the DMFC unit 11. The power generating unit may be a fuel cell other than the fuel cell using ethanol or another kind of liquid fuel. Likewise, the power generating unit may be an another type using kerosene, gasoline or another kind of liquid fuel. That is, the power generating unit is not limited to any specific type.

The liquid absorbing sheet 12 is an example of a liquid absorbing member. As shown in FIGS. 3 and 4, the liquid absorbing sheet 12 is interposed between the DMFC unit 11 and the liquid leak sensor board 13. As shown in FIG. 3, the liquid absorbing sheet 12 covers the lower portion of the DMFC unit 11, except for the front end portion of the holder 21. In other words, the liquid absorbing sheet 12 entirely covers the lower portion of the circulation section 31.

The liquid absorbing sheet 12 has a first surface 12a facing the DMFC unit 11 and a second surface 12b facing the liquid leak sensor board 13. The liquid absorbing sheet 12 is made of a permeable material that allows part of the liquid on the first surface 12a to flow to the second surface 12b. The liquid absorbing sheet 12 is made, for example, of unwoven cloth in the form of mesh. "Bi-black" (transliterated) commercially available from Japan Vilene is an example of such unwoven cloth.

The liquid absorbing sheet 12 may be made of any kind of material as long as it allows a liquid to flow therethrough. In other words, the material of the liquid absorbing sheet 12 is selectable in accordance with the property required of the sheet 12. If the liquid leak sensing function is more important to the DMFC apparatus 1 than the liquid absorbing function is, then a material having high permeability is selected. Conversely, if the liquid absorbing function is more important to the DMFC apparatus 1 than the liquid leak sensing function is, then a material having low permeability is selected. This applies to each of the embodiments to be described later.

As shown in FIGS. 3 and 4, the liquid leak sensor board 13 is interposed between the lower wall 6b of the casing 6 and the DMFC unit 11. The liquid leak sensor board 13 has substantially the same outside shape as the liquid absorbing sheet 12, for example. In other words, the liquid leak sensor board 13 covers the lower portion of the DMFC unit 11, except for the front end portion of the holder 21.

The liquid leak sensor board 13 has a third surface 13a facing the liquid absorbing sheet 12 and a fourth surface 13b facing the lower wall 6b of the casing 6. The liquid leak sensor board 13 includes a first conductive layer 33 and a second conductive layer 34 which are formed on the third surface 13a.

Figure 7:
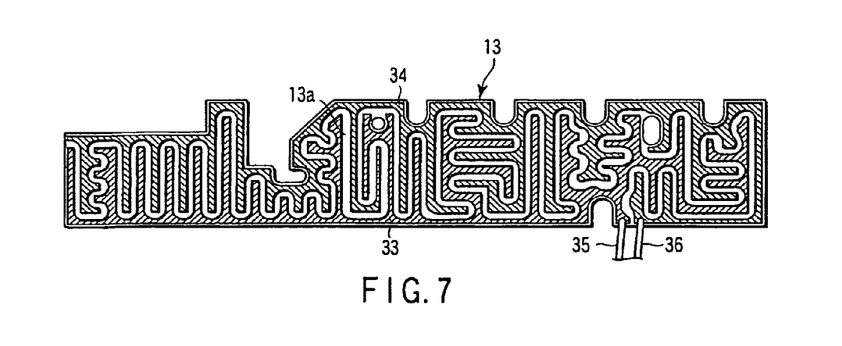
FIG. 7 is an exemplary plan view of a liquid leak sensor board according to the first embodiment.

As shown in FIG. 7, each of the first and second conductive layers 33 and 34 has a predetermined width. The first and second conductive layers 33 and 34 are formed all over the third surface 13a and are away from each other by a predetermined distance. The first and second conductive layers 33 and 34 are insulated from each other. A first terminal 35 is electrically connected to the first conductive layer 33. A second terminal 36 is connected to the second conductive layer 34.

The shapes of the first and second conductive layers 33 and 34, namely the conductive layer patterns, are not limited to those illustrated and described in relation to the liquid leak sensor board 13 of the above embodiment. The first and second conductive layers 33 and 34 may have various patterns.

Figure 8:
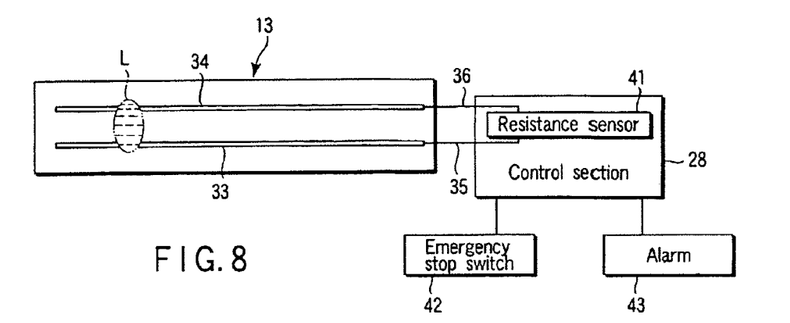
FIG. 8 is an exemplary schematic diagram showing the liquid leak sensor board and controller according to the first embodiment.

The control section 28 includes a resistance sensor 41. As schematically illustrated in FIG. 8, the first and second terminals 35 and 36 of the liquid leak sensor board 13 are extended to the control section 28 and connected to the resistance sensor 41. The resistance sensor 41 detects variations of the electric resistance between the first and second terminals 35 and 36. The control section 28 is electrically connected to an emergency stop button 42 and an alarm 43. The emergency stop button 42 is a switch operated when the DMFC unit 11 must be stopped.

The liquid leak sensor is not limited to the type described in the above embodiment (i.e., the liquid leak sensor board 13 having two conductive layers). The liquid leak sensor may be of any type as long as it can detect a liquid.

The operation of the DMFC apparatus 1 will now be described.

If an aqueous solution of methanol or water leaks from the DMFC unit 11, the leaking liquid L reaches the liquid absorbing sheet 12 located under the DMFC unit 11. Most of the leaking liquid L is absorbed in the liquid absorbing sheet 12. Part of the leaking liquid L flows through the liquid absorbing sheet 12 and reaches the third surface 13a of the liquid leak sensor board 13.

As schematically illustrated in FIG. 8, if the leaking liquid L reaching the liquid leak sensor board 13 spreads over the third surface 13a in such a manner as to connect the first and second conductive layers 33 and 34, the first and second conductive layers 33 and 34 are electrically connected through the leaking liquid L. In this case, the electric resistance between the first and second conductive layers 33 and 34 decreases. The resistance sensor 41 senses this decrease in the electric resistance.

When the resistance sensor 41 senses a decrease in the electric resistance, the control section 28 determines that a liquid leak occurs. The control section 28 controls the emergency stop switch 42 and stops the operation of the DMFC unit 11. In addition, the control section 28 causes the alarm 43 to sound, thereby notifying the user of the occurrence of the liquid leak.

The leaking liquid L absorbed in the liquid absorbing sheet 12 spreads towards the ends of the liquid absorbing sheet 12. How the liquid spreads is dependent on the shape of the liquid absorbing sheet 12.

The leaking liquid L which reaches the liquid leak sensor board 13 after passing through the liquid absorbing sheet 12 once is absorbed in the liquid absorbing sheet 12 from the second surface 12a.

With the above configuration of the DMFC apparatus 1, a liquid leak is sensed, and the leaking liquid L is absorbed. More specifically, if a liquid leak from the DMFC unit 11 occurs, the liquid leak sensor board 13 detects the liquid leak. Accordingly, the DMFC unit 11 is stopped for safety, and the alarm 43 sounds, thereby notifying the user of the occurrence of the liquid leak.

Even if a certain amount of liquid leaks in the DMFC apparatus 1, the liquid absorbing sheet 12 absorbs and holds the liquid therein, and the leaking liquid L is prevented from flowing out of the casing 6. It should be noted that the liquid absorbing sheet 12 permits the leaking liquid L from flowing therethrough toward the liquid leak sensor board 13. Owing to this feature, even though the sheet absorbing sheet 12 is interposed between the DMFC unit 11 and the liquid leak sensor board 13, the liquid leak sensor board 13 reliably detects the occurrence of a liquid leak.

Where the liquid absorbing sheet 12 is arranged on the upper side of the liquid leak sensor board 13, its shape can conform to that of the DMFC unit 11. And the liquid absorbing sheet 12 can be sufficiently large. In this manner, the liquid absorbing sheet 12 has a fully wide area. It should be also noted that the leaking liquid L between the liquid leak sensor board 13 and the DMFC unit 11 is absorbed in the liquid absorbing sheet 12.

It is effective to apply an embodiment of the present invention to a power generator using liquid fuel. In general, the liquid fuel used in the power generator is flammable. Therefore, if the power generator is provided with the liquid leak sensor board 13 and the liquid absorbing sheet 12, a liquid leak can be detected and dealt with in the initial stages. Hence, the liquid leak does not give rise to a serious situation.

The lower portion of the circulation section 31 is completely covered with both the liquid absorbing sheet 12 and the liquid leak sensor board 13. With this structure, a liquid leak can be reliably detected no matter where a liquid L leaks from the circulation section 31. In the case of the DMFC apparatus 1, the base manifold 27 and the liquid supply joints 21a and 22a between the holder 21 and the fuel cartridge 22 are components from which a liquid is most likely to leak. It is therefore effective to cover those components from below by means of the liquid absorbing sheet 12 and the liquid leak sensor board 13.

Since the liquid absorbing sheet 12 is made of a permeable material, through holes need not be formed in it. Without such through holes, part of liquid L can flow toward the liquid leak sensor board 13.

The liquid absorbing sheet 12 need not have substantially the same size as the liquid leak sensor board 13.

The liquid absorbing sheet 12 of the embodiment allows a liquid to flow in two directions, namely the direction from the first surface 12a to the second surface 12b and the direction from the second surface 12b to the first surface 12a. In place of this structure, the liquid absorbing sheet 12 may allow a liquid to flow in one direction only. For example, it may allow the liquid to flow from the first surface 12a to the second surface 12b but prevents it from flowing from the second surface 12b to the first surface 12a.

If the liquid absorbing sheet 12 is made of this type of permeable material, the leaking liquid L reaching the third surface 13a of the liquid leak sensor board 13 does not flow back. It does not exude from the first surface 12a of the liquid absorbing sheet 12. Therefore, the user can deal with malfunction of the DMFC unit 11 without touching the liquid leak L.

Figure 9:
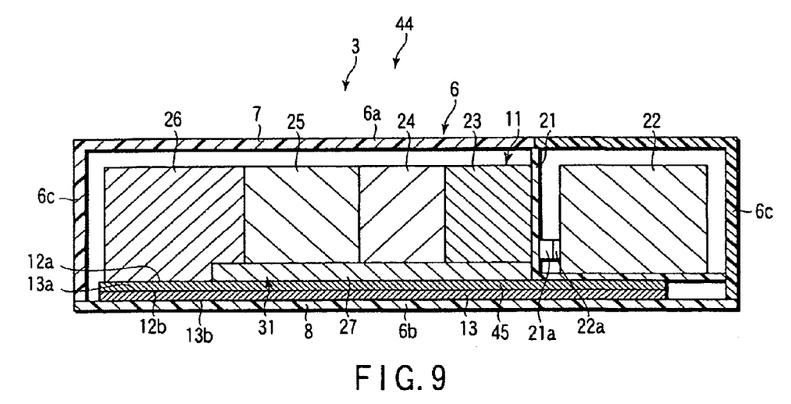
FIG. 9 is an exemplary sectional view of a DMFC apparatus according to the second embodiment of the invention.
Figure 10:
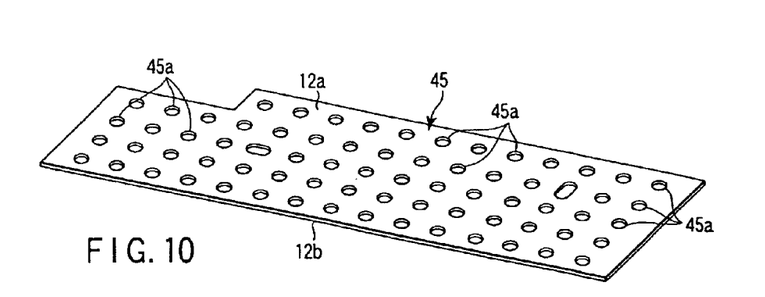
FIG. 10 is an exemplary perspective view of the liquid absorbing sheet according to the second embodiment.

A DMFC apparatus 44, which is one example of a liquid leak sensing structure according to the second embodiment of the present invention, will now be described with reference to FIGS. 9 and 10. In FIGS. 9 and 10, the same reference numerals as used in connection with the DMFC apparatus 1 of the first embodiment denote corresponding or similar structural elements, and a redundant description of such elements will be omitted herein.

As shown in FIG. 9, the DMFC apparatus 44 employs a liquid absorbing sheet 45 in place of the liquid absorbing sheet 12 of the first embodiment. As shown in FIG. 10, the liquid absorbing sheet 45 has a plurality of through holes 45a that allow communication between the first surface 12a and the second surface 12b. Part of the leaking liquid L flows toward the liquid leak sensor board 13 by way of the through holes 45a of the liquid absorbing sheet 45.

If a liquid leaks, the DMFC apparatus 44 of the above structure senses the leak and deals with the leaking liquid L. More specifically, the DMFC apparatus 44 includes a liquid leak sensor board 13 as well as the liquid absorbing sheet 45. As in the DMFC apparatus 1 of the first embodiment, the liquid leak sensor board 13 detects a liquid leaking from the DMFC unit 11. Even if a certain amount of liquid leaks, the liquid absorbing sheet 45 absorbs the leaking liquid L therein, and the leaking liquid L is prevented from flowing out of the casing 6.

By forming the through holes 45a, the liquid absorbing sheet 45 need not be made of a permeable material; it may be made of general types of liquid absorbing material. An example of the liquid absorbing material is a felt material that contains polyester, polyethylene terephthalate, rayon or the like as a major constituent.

The number of through holes 45a need not be limited and can be determined arbitrarily. In addition, the through holes 45a may be varied in size, if so desired. For example, if the liquid leak sensing function is more important to the DMFC apparatus 44 than the liquid absorbing function is, then wide through holes 45a are provided or a comparatively large number of through holes 45a are provided. Conversely, if the liquid absorbing function is more important to the DMFC apparatus 44 than the liquid leak sensing function is, then narrow through holes 45a are provided or a comparatively small number of through holes 45a are provided. This applies to each of the embodiments to be described later.

Figure 11:
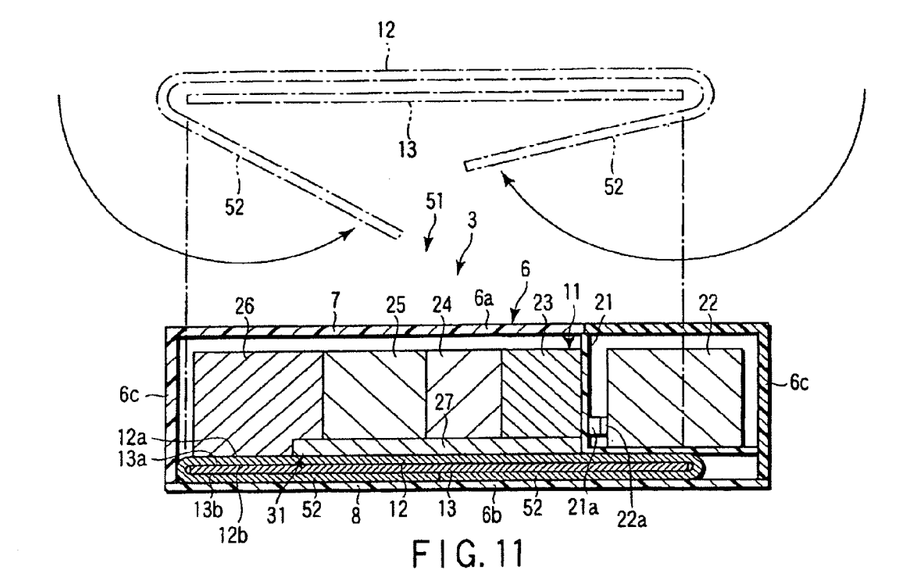
FIG. 11 is an exemplary sectional view of a DMFC apparatus according to the third embodiment of the invention.

A DMFC apparatus 51, which is one example of a liquid leak sensing structure according to the third embodiment of the invention, will now be described with reference to FIG. 11. In FIG. 11, the same reference numerals as used in connection with the DMFC apparatuses 1 and 44 of the first and second embodiments denote corresponding or similar structural elements, and a redundant description of such elements will be omitted herein.

The DMFC apparatus 51 includes one first liquid absorbing sheet 12 and two second liquid absorbing sheets 52. As indicated by the two dot chain lines in FIG. 11, the second liquid absorbing sheets 52 are at the longitudinal ends of the first liquid absorbing sheet 12 and are integrally formed with the first liquid absorbing sheet 12. In other words, the first and second liquid absorbing sheets 12 and 52 constitute one sheet.

As shown in FIG. 11, the second liquid absorbing sheets 52 are bent relative to the first liquid absorbing sheet 12 in such a manner as to cover the lower surface of the liquid leak sensor board 13. In this state, the second liquid absorbing sheets 52 are received inside the casing 6. With this structure, the second liquid absorbing sheets 52 are located between the liquid leak sensor board 13 and the lower wall 6b of the casing 6.

If a liquid leaks, the DMFC apparatus 51 of the above structure senses the leak and deals with the leaking liquid L. More specifically, the DMFC apparatus 51 includes the liquid leak sensor board 13 as well as the first liquid absorbing sheet 12. As in the DMFC apparatus 1 of the first embodiment, the liquid leak sensor board 13 detects a liquid leaking from the DMFC unit 11. Even if a certain amount of liquid leaks, the first liquid absorbing sheet 12 absorbs the leaking liquid L therein, and the leaking liquid L is prevented from flowing out of the casing 6.

The DMFC apparatus 51 of the third embodiment includes the above-mentioned second liquid absorbing sheets 52 between the liquid leak sensor board 13 and the lower wall 6b of the casing 6. With this structure, the leaking liquid L which has reached the liquid leak sensor board 13 after flowing through the first liquid absorbing sheet 12 and which is about to flow downward, is absorbed in the second liquid absorbing sheets 52. In other words, the second liquid absorbing sheets 52 can absorb and deal with the leaking liquid L which cannot be absorbed in the first liquid absorbing sheet 12 and which therefore flows out of the liquid leak sensor board 13. This structure is effective in preventing the leaking liquid L from flowing out of the casing 6. In addition, the combined use of the first and second liquid absorbing sheets 12 and 52 improves the liquid processing capacity of the DMFC apparatus 51.

Figure 12:
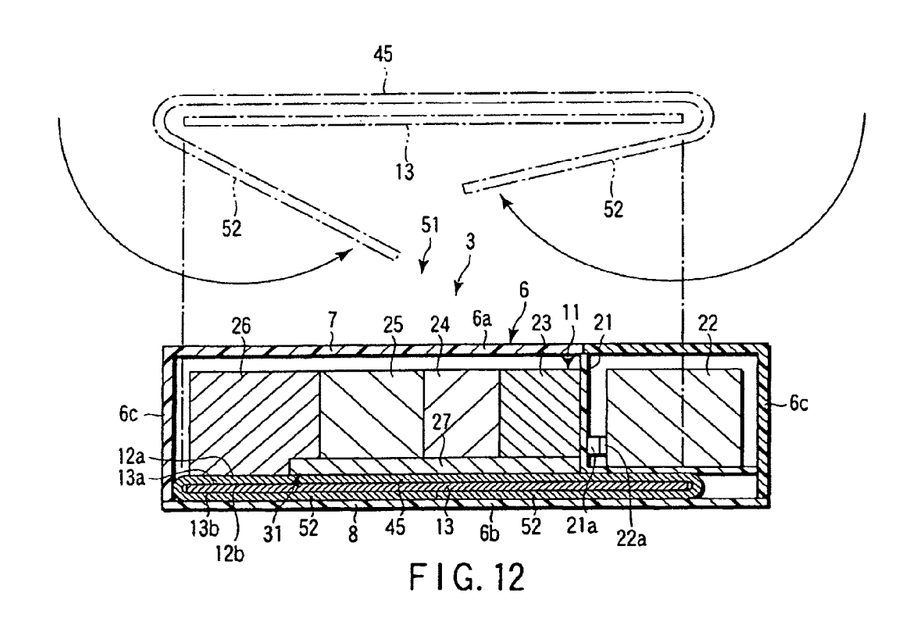
FIG. 12 is an exemplary sectional view of a modification of the DMFC apparatus of the third embodiment of the invention.

The first liquid absorbing sheet 12 and the second liquid absorbing sheets 52 need not be integral with each other and may be different sheets. For example, the second liquid absorbing sheets 52 may be made of a material that is not permeable. If this structure is applied, the leaking liquid L flowing out of the liquid leak sensor board 13 reliably remains inside the casing 6. The DMFC apparatus 51 attains the same effects even if liquid absorbing sheet 12 is replaced with liquid absorbing sheet 45, as shown in FIG. 12.

A description will now be given as to how an embodiment of the present invention is applied to a portable computer.

Figure 13:
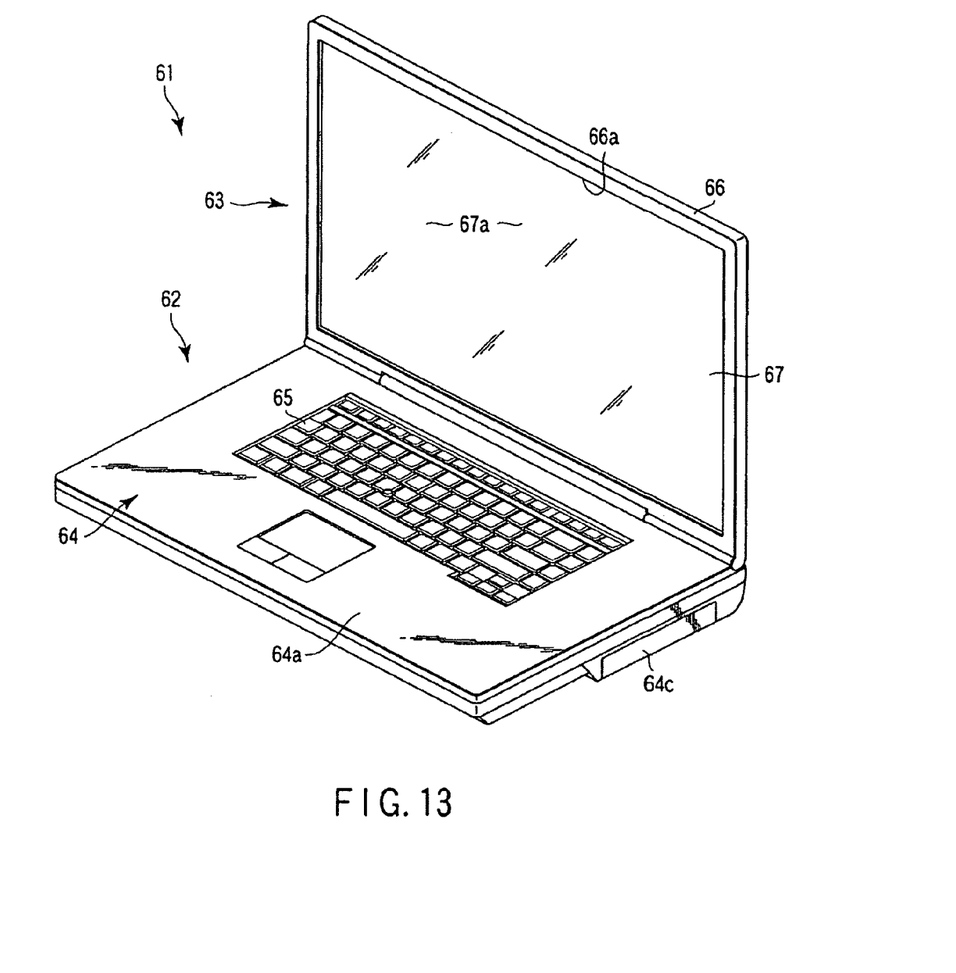
FIG. 13 is an exemplary perspective view of a portable computer according to the fourth embodiment of the invention.
Figure 14:
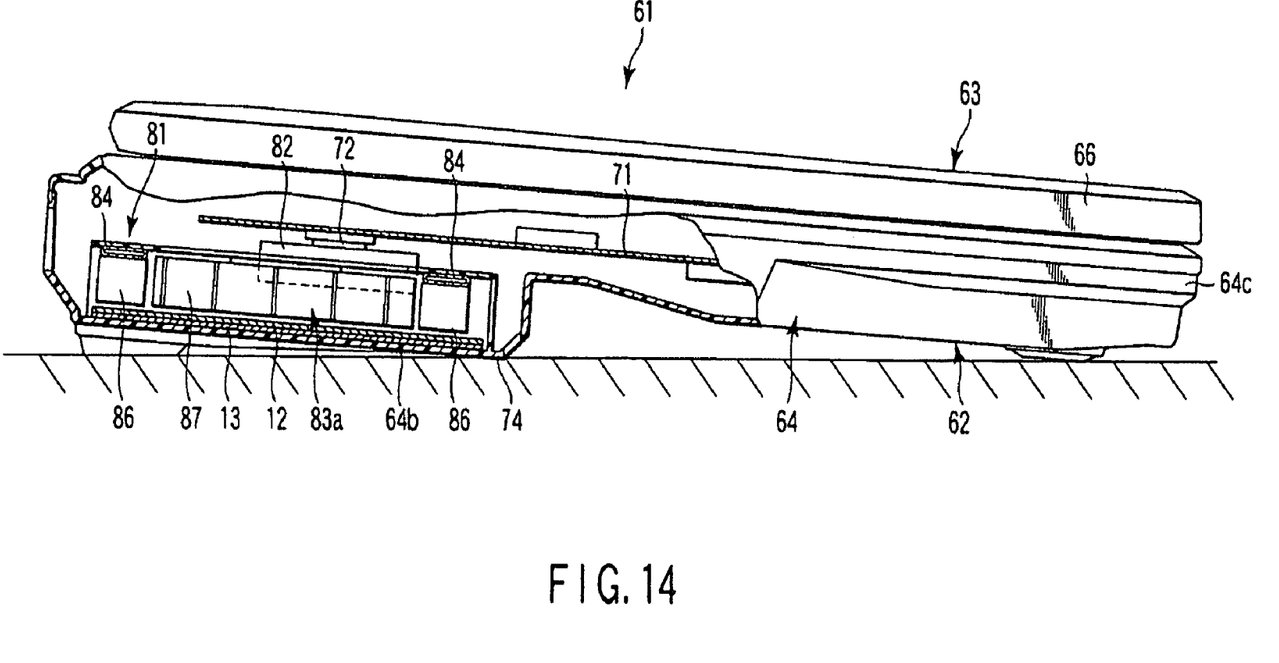
FIG. 14 is an exemplary sectional view of the portable computer according to the fourth embodiment.
Figure 15:
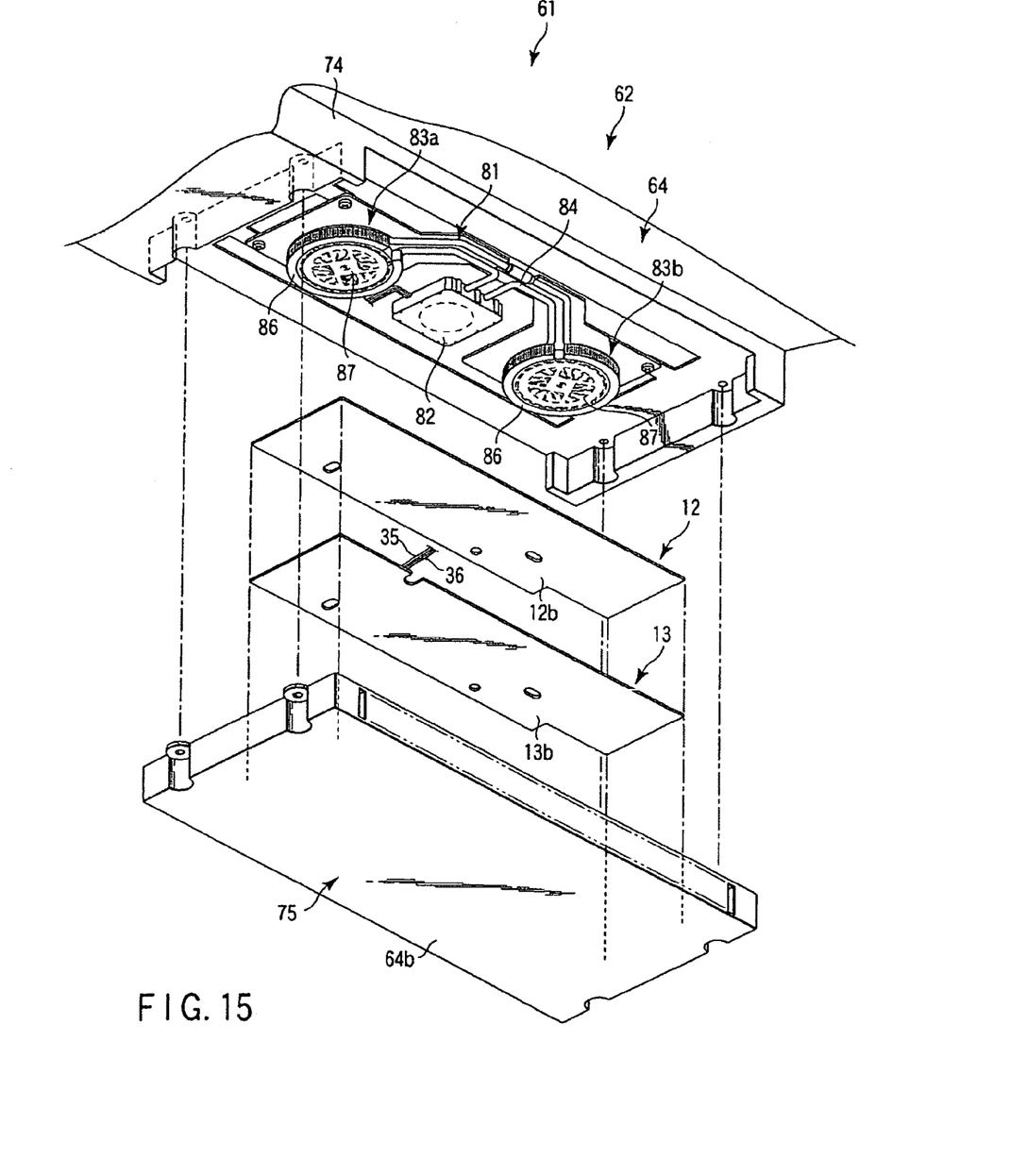
FIG. 15 is an exemplary perspective view of the cooling device according to the fourth embodiment.

A portable computer 61, which is one example of a liquid leak sensing structure according to the fourth embodiment of the present invention, will now be described with reference to FIGS. 13 to 15. In FIGS. 13-15, the same reference numerals as used in connection with the DMFC apparatuses 1, 44 and 51 of the first, second and third embodiments denote corresponding or similar structural elements, and a redundant description of such elements will be omitted herein.

As shown in FIG. 13, the portable computer 61 includes a main body 62 and a display unit 63. The main body 62 includes a casing 64 shaped like a flat box. The casing 64 has an upper wall 64a, a lower wall 64b and side walls 64c. The upper wall 64a of the casing 64 supports a keyboard 65.

The display unit 63 includes a display housing 66, and a liquid crystal display panel 67 received inside the display housing 66. The liquid crystal display panel 67 has a display screen 67a. The display screen 67a is exposed to the outside of the display housing 66 through an open section 66a provided on the front side of the display housing 66.

The display unit 63 is supported at the rear portion of the casing 64 by means of a hinge. Thus, the display unit 63 is rotatable between a closed position where it covers the upper wall 64a from above and an open position where it stands and permits the upper wall 64a and the display screen 67a to be exposed.

As shown in FIG. 14, the casing 64 has a circuit board 71 inside, and a CPU 72 is mounted on the rear portion of the circuit board 71. The lower wall 64b of the casing 64 has a bulge 74. This bulge 74 is located in the rear half of the lower wall 64b and protrudes downward more than the front half of the lower wall 64b.

As shown in FIG. 15, the bulge 74 has a bottom cover 75. The bottom cover 75 constitutes part of the lower wall 64b of the casing 64. As shown in FIG. 14, the bulge 74 contains a liquid-using cooling unit 81, a liquid absorbing sheet 12 and a liquid leak sensor board 13.

The cooling unit 81 is an example of a circulation unit. As shown in FIG. 15, the cooling unit 81 includes a heat receiving section 82, a pair of heat radiating sections 83a and 83b, and a circulation path 84. The circulation path 84 is an example of a circulation section. As shown in FIG. 14, the heat receiving section 82 is adjacent to, and thermally coupled to the CPU 72 (which is one example of a heat generating component). As shown in FIG. 15, the heat radiating sections 83a and 83b are on the respective sides of the heat receiving section 82. Each heat radiating section is provided with a heat radiating fin 86 and a heat radiating fan 87.

The circulation path 84 is provided in such a manner as to surround the heat receiving section 82 and the heat radiating sections 83a and 83b. The circulation path 84 is thermally coupled to the heat receiving section 82 and the heat radiating fins 86 of the heat radiating sections 83a and 83b. A liquid refrigerant flows along the circulation path 84, and is circulated between the heat receiving section 82 and the heat radiating sections 83a and 83b by means of a pump, for example (not shown).

The heat radiated from the CPU 72 is transferred to the heat receiving section 82. Then, the heat is transferred from the heat receiving section 82 to the circulation path 84 at positions adjacent to the heat receiving section 82, and is therefore transferred to the liquid refrigerant flowing in the circulation path 84. The heat is absorbed in the liquid refrigerant. The liquid refrigerant in which the heat is absorbed flows to the heat radiating sections 83a and 83b, where it is cooled by the heat radiating fins 86 and heat radiating fans 87. In this manner, the absorbed heat is radiated. After this heat radiation, the liquid refrigerant flows again to the heat receiving section 82 and absorbs heat there.

One example of the liquid refrigerant which the cooling unit 81 uses is antifreeze liquid or water, but is not limited to any particular kind.

As shown in FIGS. 14 and 15, the liquid absorbing sheet 12 is interposed between the cooling unit 81 and the liquid leak sensor board 13. The liquid absorbing sheet 12 covers the lower portion of the cooling unit 81 entirely. In other words, the liquid absorbing sheet 12 covers the lower portion of the circulation path 84 of the cooling unit 81.

As shown in FIGS. 14 and 15, the liquid leak sensor board 13 is interposed between the lower wall 64b of the casing 64 and the cooling unit 81. The liquid leak sensor board 13 has substantially the same shape as the liquid absorbing sheet 12, for example. In other words, the liquid leak sensor board 13 covers the lower portion of the cooling unit 81 entirely.

If the liquid refrigerant leaks from the cooling unit 81, the portable computer 61 of the above structure senses the leak and deals with the leaking liquid L. More specifically, the portable computer 61 includes a liquid leak sensor board 13 as well as the liquid absorbing sheet 12. As in the DMFC apparatus 1 of the first embodiment, the liquid leak sensor board 13 detects a liquid leaking from the cooling unit 81. Even if a certain amount of liquid leaks, the liquid absorbing sheet 12 absorbs the leaking liquid L therein, and the leaking liquid L is prevented from flowing out of the casing 64.

It is effective to apply an embodiment of the present invention to the cooling unit 81 that uses a liquid refrigerant. In general, the electronic components cooled by the cooling unit 81 are seriously damaged if they get wet. If the user repairs a malfunction without the leaking liquid being absorbed and dealt with, the leaking liquid L may spread and attach to an electronic component. In such a case, the electronic component would be seriously damaged. However, where the liquid absorbing sheet 12 that absorbs the leaking liquid L is used as in the fourth embodiment of the invention, the damage to the electronic components is prevented.

Figure 16:
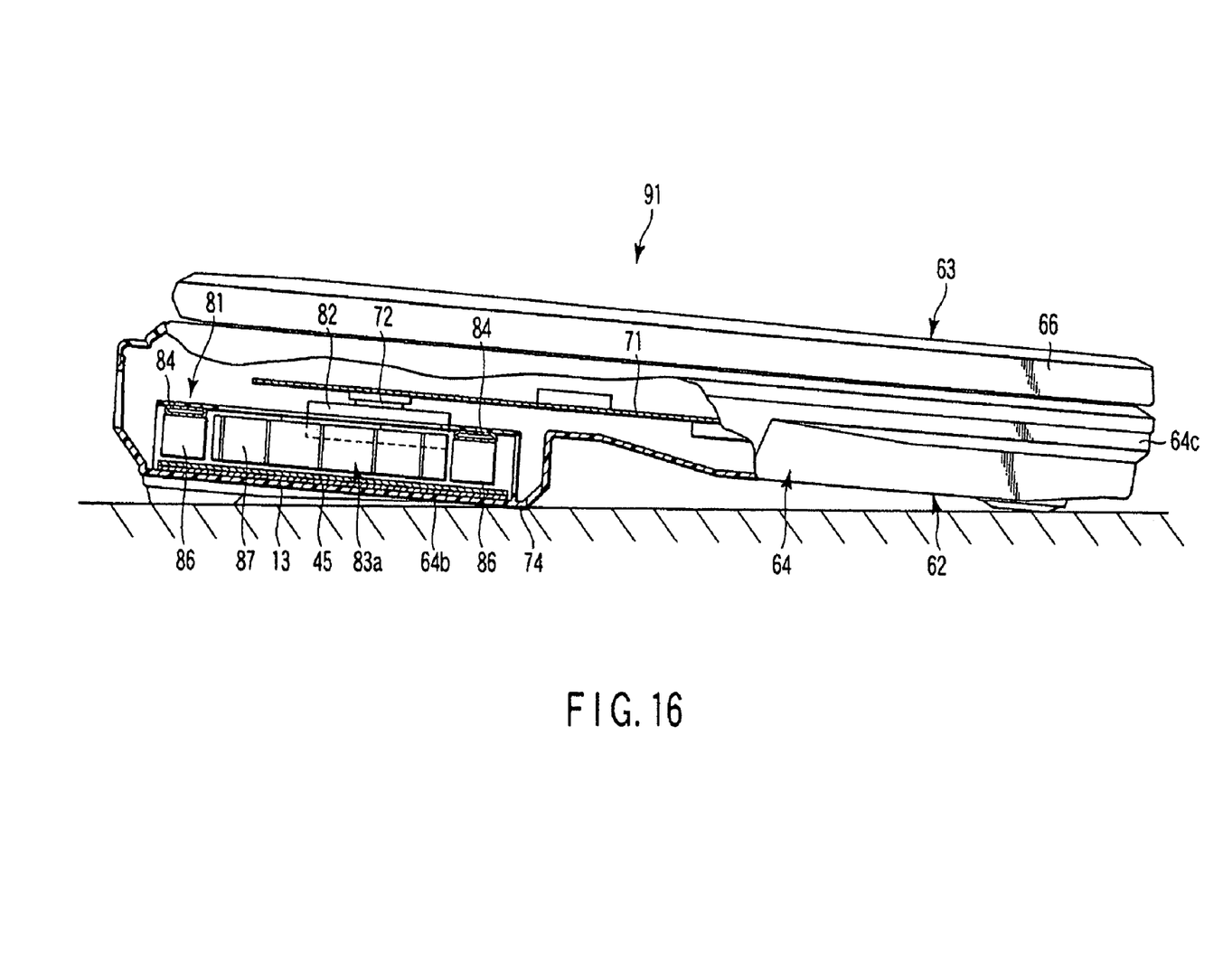
FIG. 16 is an exemplary sectional view of a portable computer according to the fifth embodiment of the invention.

A portable computer 91, which is a liquid leak sensing structure according to the fifth embodiment of the present invention, will now be described with reference to FIG. 16. In FIG. 16, the same reference numerals as used in connection with the DMFC apparatuses 1, 44 and 51 of the first to third embodiments and the portable computer 61 of the fourth embodiment denote corresponding or similar structural elements, and a redundant description of such elements will be omitted herein.

As shown in FIG. 16, the portable computer 91 employs a liquid absorbing sheet 45 in place of the liquid absorbing sheet 12 of the fourth embodiment.

If a liquid leaks, the portable computer 91 of the above structure senses the leak and deals with the leaking liquid L. By forming through holes 45a in the liquid absorbing sheet 45, the liquid absorbing sheet 45 need not be made of a permeable material; it may be made of general types of liquid absorbing material.

Figure 17:
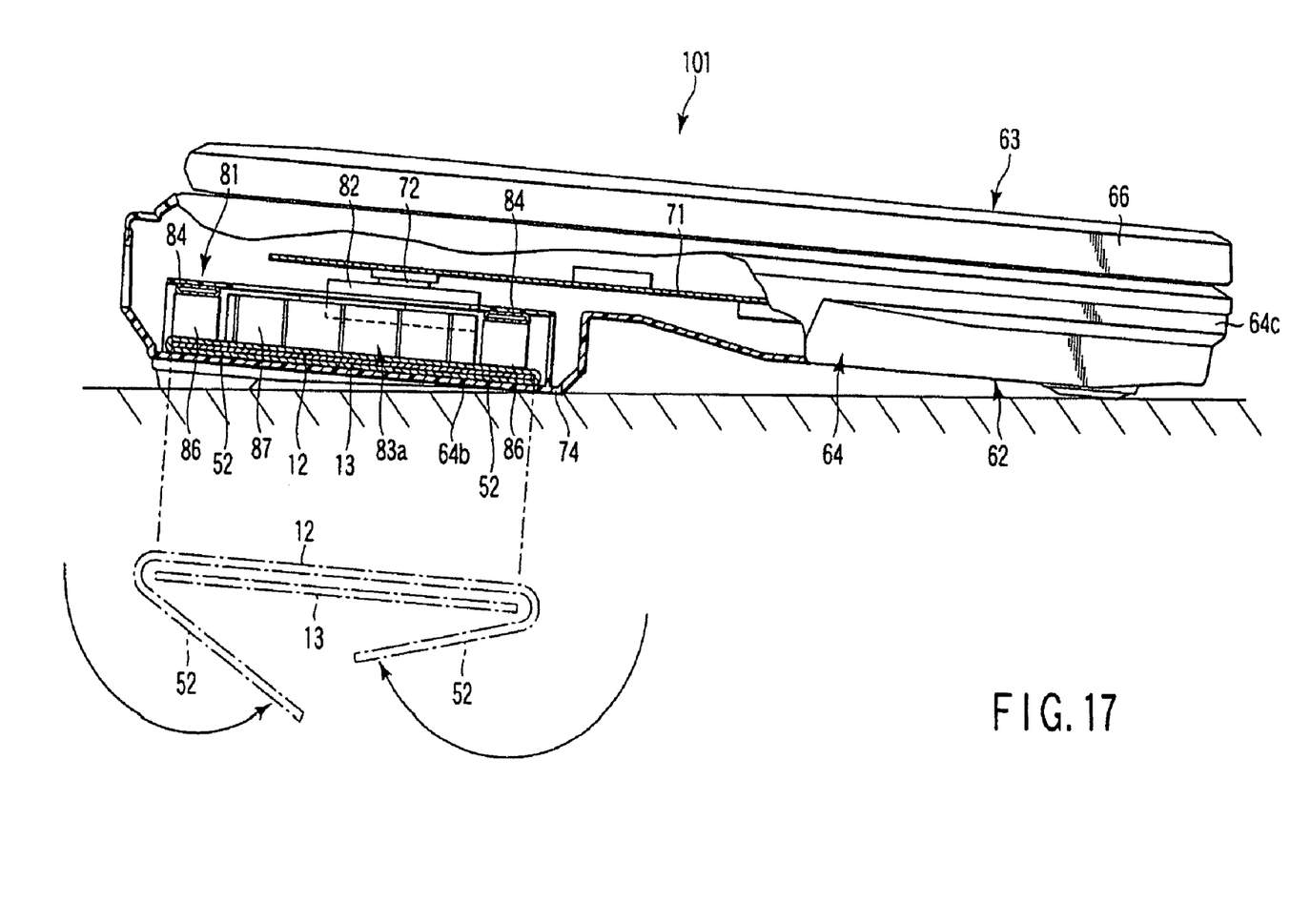
FIG. 17 is an exemplary sectional view of a portable computer according to the sixth embodiment of the invention.

A portable computer 101, which is a liquid leak sensing structure according to the sixth embodiment of the present invention, will now be described with reference to FIG. 17. In FIG. 17, the same reference numerals as used in connection with the DMFC apparatuses 1, 44 and 51 of the first to third embodiments and the portable computer 61 of the fourth embodiment denote corresponding or similar structural elements, and a redundant description of such elements will be omitted herein.

As shown in FIG. 17, the portable computer 101 includes one first liquid absorbing sheet 12 and two second liquid absorbing sheets 52. As indicated by the two dot chain lines in FIG. 17, the second liquid absorbing sheets 52 are at the longitudinal ends of the first liquid absorbing sheet 12 and are integrally formed with the first liquid absorbing sheet 12.

As shown in FIG. 17, the second liquid absorbing sheets 52 are bent relative to the first liquid absorbing sheet 12 in such a manner as cover the lower surface of the liquid leak sensor board 13. In this state, the second liquid absorbing sheets 52 are received inside the casing 64. With this structure, the second liquid absorbing sheets 52 are located between the liquid leak sensor board 13 and the lower wall 64b of the casing 64.

If a liquid leaks, the portable computer 101 of the above structure senses the leak and deals with the leaking liquid L.

Figure 18:
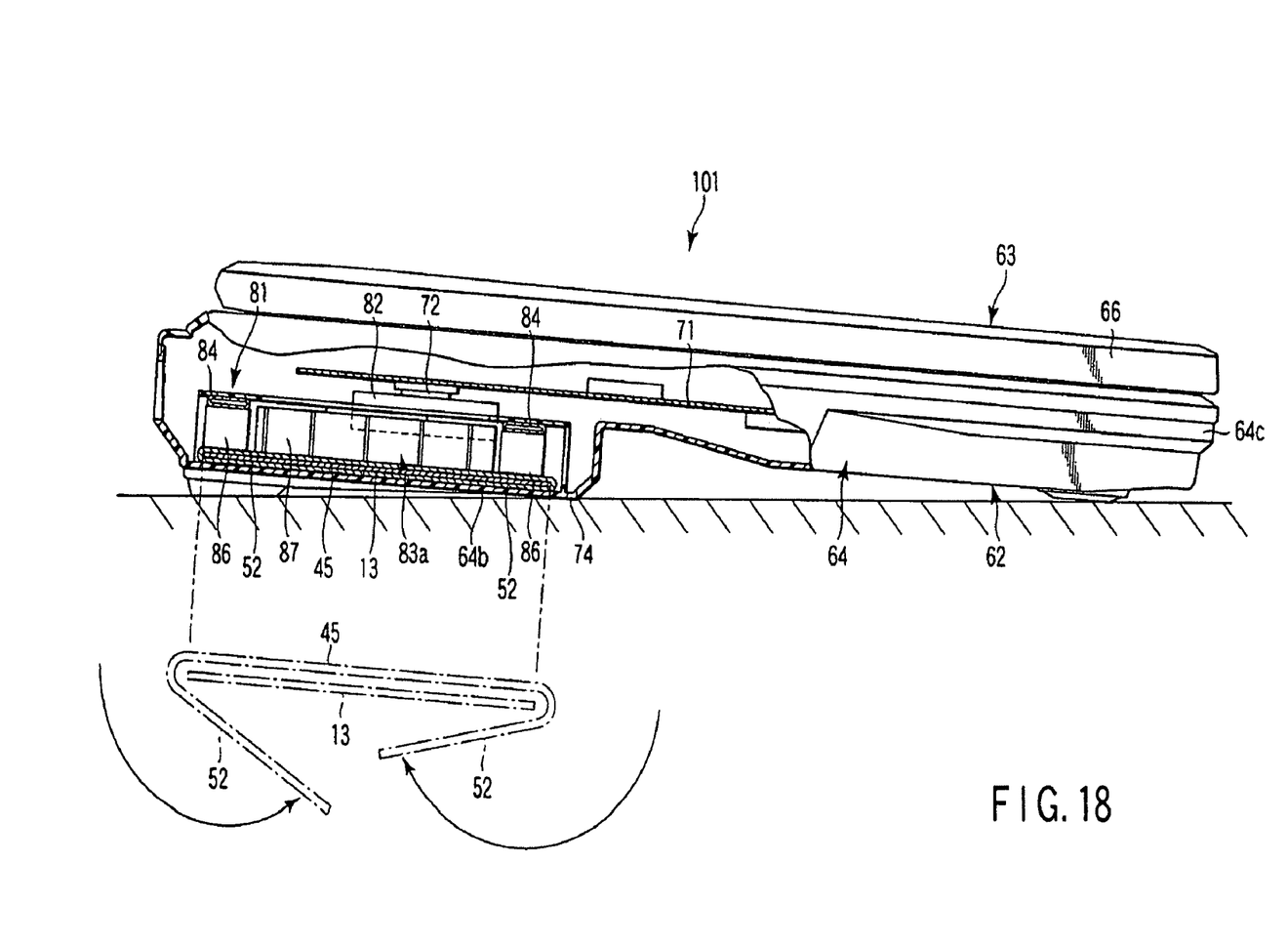
FIG. 18 is an exemplary sectional view showing a modification of the portable computer of the sixth embodiment of the invention.

More specifically, the portable computer 101 of the sixth embodiment includes the above-mentioned second liquid absorbing sheets 52 between the liquid leak sensor board 13 and the lower wall 64b of the casing 64. With this structure, the leaking liquid L which has reached the liquid leak sensor board 13 after flowing through the first liquid absorbing sheet 12 and which is about to flow downward, is absorbed in the second liquid absorbing sheets 52. As shown in FIG. 18, the portable computer 101 may use liquid absorbing sheet 45 in place of liquid absorbing sheet 12. The same effects as described above are obtained in this case as well.

In the foregoing, reference was made to the DMFC apparatuses 1, 44 and 51 of the first to third embodiments and the portable computers 61, 91 and 101 of the fourth to sixth embodiments. Needless to say, these are not all embodiments of the present invention. The structural elements of the foregoing embodiments may be combined properly. In addition, the "liquid" to which the embodiments of the present invention are applicable is not limited to a liquid fuel or a liquid refrigerant. The "liquid" may be any kind and may be used for any purpose, as long as the liquid has fluidity. Furthermore, it should be noted that an embodiment of the present invention is not limited to a power generator or a cooling unit. For example, an embodiment of the present invention is applicable to a tank in which a liquid is kept.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A liquid leak sensing structure comprising:
   a first casing comprising a lower wall, a first wall and a second wall, the first wall and the second wall arise from a first edge portion of the lower wall, the first wall and the second wall being spaced from each other;
   a circulation unit in the first casing configured to provide circulation of a liquid;
   a liquid leak sensor between the lower wall and the circulation unit;
   a liquid absorbing member between the liquid leak sensor and the circulation unit, the liquid absorbing member being configured to permit part of the liquid from the circulation unit to flow through the liquid adsorbing member toward the liquid leak sensor; and
   a second casing adjacent to the first casing, an inside of the second casing communicates to an inside of the first casing between the first wall and the second wall, the second casing comprising a control section and a first gap between the first wall and the control section.

2. The liquid leak sensing structure of claim 1, wherein the first gap allows part of the liquid on the liquid leak sensor to flow through the first gap.

3. The liquid leak sensing structure of claim 2, wherein the second casing comprises a second gap between the second wall and the control section, the second gap allowing part of the liquid on the liquid leak sensor to flow through the second gap.

4. The liquid leak sensing structure of claim 1, wherein the second casing is a mount section on which an electronic device is mounted.

5. The liquid leak sensing structure of claim 4, wherein the second casing comprises a connector exposed to an outside.

6. The liquid leak sensing structure of claim 1, wherein the first wall and the second wall face in a same direction.

7. The liquid leak sensing structure of claim 1, wherein the first casing comprises a third wall arising from a second edge portion of the lower wall, and facing in an opposite direction to that of the first wall and the second wall.

8. The liquid leak sensing structure of claim 7, wherein the circulation unit, the liquid leak sensor and the liquid absorbing member are between the first and second walls and the third wall.

9. The liquid leak sensing structure of claim 7, wherein the liquid absorbing member comprises a through hole larger than a pore of a material of which the liquid absorbing member is made and through which part of the liquid from the circulation unit flows toward the liquid leak sensor.

10. A fuel cell device comprising:
    a first casing comprising a lower wall;
    a circulation unit in the first casing configured to provide circulation of a liquid;
    a liquid leak sensor between the lower wall and the circulation unit; and
    a liquid absorbing member between the liquid leak sensor and the circulation unit, the liquid absorbing member being configured to permit part of the liquid from the circulation unit to flow through the liquid absorbing member toward the liquid leak sensor;
    a second casing adjacent to the first casing; and
    a control section in the second casing.

11. The fuel cell device of claim 10, wherein the first casing comprises a first wall and a second wall, the first wall and the second wall arise from an edge portion of the lower wall, the first wall and the second wall being spaced from each other, and
    the device further comprises a second casing, an inside of the second casing communicates to the first casing between the first wall and the second wall, and a gap between the first wall and the control section, through which the part of the liquid which has reached the liquid leak sensor can flow.

12. The fuel cell device of claim 11, wherein the liquid absorbing member comprises a through hole larger than a pore of a material of which the liquid absorbing member is made and through which part of the liquid from the circulation unit flows toward the liquid leak sensor.

13. A fuel cell device comprising:
    a first casing comprising a lower wall;
    a circulation unit in the first casing configured to provide circulation a liquid;
    a liquid leak sensor between the lower wall and the circulation unit;
    a liquid absorbing member between the liquid leak sensor and the circulation unit, the liquid absorbing member being configured to permit part of the liquid from the circulation unit to flow through the liquid absorbing member toward the liquid leak sensor; and
    a mount section adjacent to the first casing, configured to hold an electronic device mounted on the mount section.

14. The fuel cell device of claim 13, wherein the mount section comprises a second casing and a control section in the second casing.

15. The fuel cell device of claim 14, wherein the first casing comprises a first wall and a second wall, the first wall and the second wall arise from an edge portion of the lower wall, and
    an inside of the second casing communicates to an inside of the first casing between the first wall and the second wall, a first gap being between the first wall and the control section, the first gap allowing part of the liquid on the liquid leak sensor to flow through the first gap.

16. The fuel cell device of claim 15, the second casing comprising a second gap between the second wall and the control portion, the second gap allowing part of the liquid on the liquid leak sensor to flow through the second gap.

17. The fuel cell device of claim 13, wherein the mount section comprises a connector exposed to an outside.

18. The fuel cell device of claim 13, wherein the liquid absorbing member comprises a through hole larger than a pore of a material of which the liquid absorbing member is made and through which part of the liquid from the circulation unit flows toward the liquid leak sensor.

* * * * *